US007870878B2

(12) United States Patent
Zhevago et al.

(10) Patent No.: US 7,870,878 B2
(45) Date of Patent: Jan. 18, 2011

(54) APPARATUS FOR STORAGE AND LIBERATION OF COMPRESSED HYDROGEN GAS IN MICROCYLINDRICAL ARRAYS AND SYSTEM FOR FILLING THE MICROCYLINDRICAL ARRAYS

(75) Inventors: Nikolay Zhevago, Moscow (RU); Emil Denisov, Moscow (RU)

(73) Assignees: C. En. Limited, Road Town, Tortola (VG); Moshe Stern, Herzlia (IL)

( * ) Notice: Subject to any disclaimer, the term of this patent is extended or adjusted under 35 U.S.C. 154(b) by 300 days.

(21) Appl. No.: 12/177,597

(22) Filed: Jul. 22, 2008

(65) Prior Publication Data

US 2009/0120811 A1 May 14, 2009

Related U.S. Application Data

(60) Provisional application No. 60/986,420, filed on Nov. 8, 2007.

(51) Int. Cl.
*F17C 1/00* (2006.01)
*B65D 85/00* (2006.01)

(52) U.S. Cl. .............................. 141/2; 141/18; 206/0.6; 222/129; 220/359.1

(58) Field of Classification Search .................. 206/0.6; 222/3, 52, 129, 591, 81, 83; 141/2, 18, 95; 220/359.1, 581
See application file for complete search history.

(56) References Cited

U.S. PATENT DOCUMENTS 872,795 A 12/1907 Burger
4,303,731 A * 12/1981 Torobin ...................... 428/333
4,328,768 A 5/1982 Tracy et al.
6,231,642 B1 * 5/2001 Shelby et al. .................. 95/45

(Continued)

FOREIGN PATENT DOCUMENTS

EP 1944539 A1 * 7/2008

(Continued)

OTHER PUBLICATIONS

European Search Report, dated Aug. 17, 2009, from corresponding European Application No. EP 08006556.

(Continued)

*Primary Examiner*—Frank M Lawrence
(74) *Attorney, Agent, or Firm*—Houston Eliseeva, LLP

(57) ABSTRACT

An apparatus for storage and liberation of compressed hydrogen or other gases is provided. The apparatus includes a housing defining a chamber that includes a cartridge comprising an array of hollow microcylinders defining cavities for storage compressed gas. Each microcylinder has at least one end sealed with a plug made of an easily meltable alloy. The apparatus also includes a gas liberating tool configured for controllable liberating the gas from the cartridge into the chamber; and a control system operatively coupled to the discharge valve and liberating tool, and configured for controlling operation thereof. According to another aspect of the invention, there are provided a system and method for filling a cartridge having an array of hollow microcylinders having open ends. The filling includes placing the cartridge into a chamber of an autoclave, and compressing the gas in the chamber, thereby providing permeation of the gas through the open ends into cavities of the microcylinders. Thereafter, the open ends are sealed with plugs made of an easily meltable alloy.

18 Claims, 2 Drawing Sheets

U.S. PATENT DOCUMENTS

| | | | |
|---|---|---|---|
| 7,112,239 | B2 | 9/2006 | Kimbara et al. |
| 2005/0145378 | A1 | 7/2005 | Mori et al. |

FOREIGN PATENT DOCUMENTS

| | | | |
|---|---|---|---|
| RU | 2267694 | C1 | 1/2006 |
| RU | 2283453 | C2 | 9/2006 |
| RU | 2283454 | C1 | 9/2006 |
| RU | 2285859 | C1 | 10/2006 |
| RU | 2304727 | C1 | 8/2007 |
| RU | 2327078 | C2 | 6/2008 |
| RU | 2339870 | C1 | 11/2008 |
| RU | 2345273 | C1 | 1/2009 |
| WO | 2005/028945 | A2 | 3/2005 |
| WO | 2006/046248 | A1 | 5/2006 |
| WO | 2007/008105 | | 1/2007 |
| WO | 2007/072470 | A1 | 6/2007 |
| WO | 2007/144868 | | 12/2007 |

OTHER PUBLICATIONS

Zhevago, N. K. et al., “Hydrogen storage in capillary arrays”, Energy conversation and management, Elsevier Science publishers, Oxford, GB, vol. 48, No. 5, Mar. 23, 2007, pp. 1554-1559.

* cited by examiner 20
213
14
143
143
143
143
143
146
147
251
252
25
253
22
221
24
23
265
264
212
261
263
254
211
21
262
26

APPARATUS FOR STORAGE AND LIBERATION OF COMPRESSED HYDROGEN GAS IN MICROCYLINDRICAL ARRAYS AND SYSTEM FOR FILLING THE MICROCYLINDRICAL ARRAYS

RELATED APPLICATIONS

This application claims the benefit under 35 USC 119(e) of U.S. Provisional Application No. 60/986,420, filed on Nov. 8, 2007, which is incorporated herein by reference in its entirety.

FIELD OF THE INVENTION

The present invention relates generally to fuel storage, and in particular, to accumulation, storage and liberation of gases.

BACKGROUND OF THE INVENTION

It is well-known that hydrogen is a very high energy density element and clean-burning fuel. Hydrogen can be combined with oxygen through combustion, or through a fuel cell mediated oxidation/reduction reactions, to produce heat, or electrical power. The primary product of this reaction is water, which is non-polluting and can be recycled to regenerate hydrogen and oxygen.

Currently, hydrogen energetics is the focus of interest in nuclear industry, motor transport, auto industry, chemical industry, aerospace industry, etc. In particular, the transport sector is a consumer of about half of the world's crude oil production. Moreover, in large metropolitan agglomerations worldwide, road traffic represents one of the most important and fastest growing emission sources for both pollutants and noise. Hydrogen as a new vehicle fuel provides the opportunity for both the reduction or avoidance of polluting emissions, and the drastic reduction of the noise level produced.

One of the hurdles facing hydrogen energetics is safe storage and delivery of hydrogen fuel to a combustion cell. Most generally, several approaches were developed, including physical storage (liquid or compressed hydrogen) and chemical storage (hydrogen absorption in metal hydrides, and hydrogen adsorption in carbon nano-fibers). All these approaches have fundamental limitations in weight and volume capacities of the storage media.

It is known that compressed hydrogen can be safely stored in microcapsules, such as hollow glass microspherical and/or microcylindrical (multi-capillary) arrays. If heated, the glass permeability to hydrogen will increase. Hydrogen can diffuse into the hollow cores of the microspheres and/or microcylinders through the thin glass walls at a rate strongly depending upon the wall temperature. This provides the ability to fill the microcapsules with gas by placing the microspheres and/or microcylinders in high-temperature and high pressure environments. Once cooled, the microcapsules lock the hydrogen inside since the diffusion rate is drastically lower at room temperature. A subsequent increase in temperature will increase the diffusion rate. Thus, the hydrogen trapped in the microspheres can be released by subsequently increasing the temperature.

For example, U.S. Pat. No. 4,328,768 describes a fuel storage and delivery system wherein hollow microspheres filled with hydrogen gas are stored in a fuel storage chamber at pressures of 400 atm. From the fuel storage chamber the microspheres are directed through a heated delivery chamber wherein hydrogen gas is freed by diffusion and delivered to an engine, after which the substantially emptied microspheres are delivered to a second storage chamber. The substantially emptied microspheres are removed by mechanical means, such as a pump, to a storage chamber from which they can be removed for refilling.

International Publication No. WO2006/046248A1 to Chabak describes a hydrogen accumulation and storage material and a method of forming thereof. The material comprises a plurality of various-sized and at least partially permeable to hydrogen microspheres bound together to form a rigid structure in which a diameter of the microspheres is reduced from a center of the structure towards edges of the structure. An outer surface of the rigid structure can be enveloped by a sealing layer, thereby closing interspherical spaces.

International Publication No. WO2005/028945A2 to Vik describes a storage apparatus for storing a highly pressurised gas such as hydrogen. The apparatus comprises an outer vessel and a plurality of separately sealed inner vessels. Means are provided for communication with the interiors of the inner vessels and of the outer vessel respectively. The inner and outer vessels may be of any suitable shape. For example, the inner vessels are substantially spherical. Alternatively, the inner vessels are in the form of tubes which are preferably straight and parallel to one another. The inner vessels are preferably made of carbon fibre reinforced epoxy.

International Publication No. WO2007/072470A1 to Gnedenko, et al. describes an apparatus for storage of compressed hydrogen gas. The apparatus includes a sealed housing that defines a chamber that includes a cartridge comprising a plurality of cylindrical voids containing the compressed hydrogen gas. The apparatus also includes a hydrogen liberating tool configured for controllable liberating the hydrogen gas from the cartridge into a volume of the chamber that is not occupied by the cartridge.

According to one embodiment described in WO2007/072470, the cartridge includes an assembly structure formed of a plurality of closely packed hollow microcylinders having sealed ends. In this case, the hydrogen liberating tool can include an electrically heating element, such as a wire woven within the cartridge in empty inter-cylinder spaces along the microcylinders, for liberating the hydrogen stored within the microcylinders into the inter-cylinder spaces and the other volume of the case that is not occupied by the microcylinders. Alternatively, the liberating tool can include a mechanical opener that is mounted on a shaft of an electric drive and configured for gradual destroying of the microcylinder ends proximal to the liberating tool.

According to another embodiment described in WO2007/072470, the cartridge includes a monolithic block having a plurality of cylindrical cavities. The ends of the cavities, proximate to the hydrogen liberating tool, are covered with a hydrogen diffuser plate. In this case, the hydrogen liberating tool includes a controllable radiation source for providing photo-enhanced diffusion of hydrogen through the hydrogen diffuser plate.

SUMMARY OF THE INVENTION

One of the problems associated with liberation of compressed hydrogen by diffusion is associated with a relatively low rate of temperature induced hydrogen release from the microcapsules. In particular, in order to release gas from microcapsules at a practically useful rate, the activation energy for permeability through the glass should exceed 57 kJ/mol. Moreover, the cross-sectional dimension of the microcapsules should preferably be smaller than about 80 microns. For example, industrial borosilicate glasses should be heated over 600° C. to obtain the required hydrogen liberation rate. As a result of the heating, the pressure inside the microcapsules can be increased, while the tensile strength of glass can be decreased, when compared to microcapsules under normal conditions. Both these factors may cause breakage of the microcapsules.

On the other hand, when the liberation of compressed hydrogen from the microcapsules is carried out with a mechanical opener, the microcapsules are destroyed during operation. In this case, the cartridge can only be expandable, and must be replaced without possibility of refilling.

Accordingly, there is still a need in the art for further improvement of the technique for accumulation and storage of hydrogen in order to provide a more effective hydrogen load and liberation, which will result in increased safety and cost-saving.

According to one general aspect, the present invention partially eliminates disadvantages of the prior art techniques and provides a novel apparatus for storage and liberation of compressed hydrogen gas including one or more novel cartridges containing hydrogen gas, a hydrogen liberating tool, and a control system configured for controlling operation of the apparatus.

According to one embodiment of the present invention, the apparatus comprises a housing defining a chamber that includes a cartridge comprising an array of hollow microcylinders defining cavities for storage compressed gas, e.g., hydrogen. The housing includes a detachable cover adapted to open and seal the housing. Each microcylinder has at least one end sealed with a plug. The microcylinders can have a tapering portion in the vicinity of plugs. The plugs are made of an easily meltable alloy having a melting temperature lower than the working temperature of the microcylinder material. For the purpose of the present invention the term "working temperature" refers to the temperature below which mechanical properties of the microcylinder material do not change significantly. The apparatus further includes a controllable discharge valve coupled to the housing through an outlet pipe.

It should be noted that the apparatus of the present invention is not limited by any specific gas and can also be used for storage and liberation of gases other than hydrogen, e.g. methane, oxygen and so on. When desired, a mixture of various gases can also be employed.

The apparatus further includes a gas liberating tool configured for controllable liberation of the hydrogen or other gases from the cartridge into a volume of the chamber that is not occupied by the cartridge. The apparatus also includes a control system operatively coupled to the controllable discharge valve and the gas liberating tool. The control system is configured for controlling operation of the discharge valve and gas liberating tool.

According to an embodiment of the present invention, the gas liberating tool includes a thermal opener and an electric drive. The thermal opener is arranged in the housing and mounted on a shaft. The electric drive is mechanically connected to the shaft for providing motion to the thermal opener. For example, the thermal opener can include a heating strip coupled to a controllable power source coupled to the control system.

According to one embodiment of the present invention, the control system includes a pressure sensor, a temperature sensor, a flow meter and a controller. The pressure sensor is arranged in the chamber and configured for producing a pressure sensor signal representative of the gas pressure in the chamber. The temperature sensor is arranged in the vicinity of the thermal opener. The temperature sensor is configured for measuring a temperature of the thermal opener, and producing a temperature sensor signal indicative of the temperature thereof. The flow meter is configured for producing a gas flow sensor signal representative of the flow of the gas in the outlet pipe.

The controller is operatively coupled to the thermal opener, the electric drive, pressure sensor and the flow meter. The controller is responsive to the pressure sensor signal, the temperature sensor signal, and the gas flow sensor signal. In operation, the controller is capable of generating control signals for controlling the operation of the thermal opener, the electric drive, and the discharge valve.

The apparatus can further include at least one safety valve that can be automatically open when pressure in the chamber reaches a dangerous level.

The apparatus according to the present invention is of durable and reliable construction. Moreover, the apparatus according to the present invention may have a low manufacturing cost.

According to another general aspect of the invention, there is provided a system for filling a cartridge having an array of hollow microcylinders having open ends and adapted for storing hydrogen or other gases. The system comprises an autoclave, a sealing unit and a control unit.

The autoclave has a housing coupled to a source of gas used for the filling of the cartridge through an inlet manifold equipped with a controllable inlet valve. The housing defines a chamber configured for holding the cartridge such that the hollow microcylinders are arranged vertically with the open ends directed down. The sealing unit is configured for sealing the open ends. The control unit is coupled to the sealing unit and to the controllable inlet valve, and configured for controlling operation thereof.

According to one embodiment of the present invention, the sealing unit comprises a crucible, an electrically heating element, a controllable compressing unit, and an electric drive. The crucible is mounted in the housing under the open ends of the microcylinders, and configured for holding an alloy required for forming plugs to seal the microcylinders. The electrically heating element is associated with the crucible, and configured for heating and melting the alloy located in the crucible. The controllable compressing unit is coupled to the chamber and the source of gas, and configured for providing the gas into the chamber through the inlet manifold. The electric drive is mechanically connected to the crucible, and configured for moving the crucible to bring the alloy in its melted state in contact with the open ends.

According to one embodiment of the present invention, the control unit comprises a pressure sensor and a controller. The pressure sensor is arranged in the chamber and operable for producing a gas pressure sensor signal indicative of the gas pressure in the chamber. The controller is operatively coupled to the pressure sensor, the controllable compressing unit, and to the inlet valve. The controller can be responsive to the gas pressure sensor signal, and capable of generating control signals to at least one device selected from said controllable compressing unit and the inlet valve for controlling operation thereof.

According to a further embodiment of the present invention, the control unit can further comprise a temperature sensor arranged within the crucible and operable for producing an alloy temperature sensor signal indicative of the temperature of the alloy. The temperature sensor is coupled to the controller, which can be responsive to the temperature sensor signal and capable of generating a control signal to the electrically heating element for controlling operation thereof.

According to a still further embodiment of the present invention, the control unit further comprises an alloy level meter associated with the crucible and operable for producing an alloy level sensor signal indicative of the level of the alloy in the crucible. The alloy level meter is coupled to the controller, which can be responsive to the alloy level sensor signal, and capable of generating a control signal to the electric drive. When desired, the controller can generate an alarm signal to an operator of the system, indicating that the level of the alloy is less than a predetermined level value.

According to yet another embodiment of the present invention, the control unit further comprises an alloy column meter arranged in the vicinity of the microcylinders, and operable for producing an alloy column sensor signal indicative of the length of the alloy column in the microcylinders near their open ends. The alloy column meter is coupled to the controller, which can be responsive to the alloy column sensor signal, and capable of generating a control signal to at least one device selected from the controllable compressing unit, the inlet valve and the electric drive for controlling operation thereof According to yet another general aspect of the invention, there is provided a method of filling a cartridge having an array of hollow microcylinders having open ends and adapted for storing hydrogen or other gases. The method comprises: providing the cartridge; placing the cartridge into a chamber of an autoclave having a housing coupled to a source of gas used for the filling of the cartridge; compressing the gas in the chamber, thereby providing permeation of the gas through said open ends into cavities of the hollow microcylinders; and sealing the open ends with plugs made of an easily meltable alloy having a melting temperature lower than the working temperature of the microcylinder material. The placing of the cartridge into the chamber includes arranging the cartridge vertically such that the open ends are directed down.

According one embodiment of the present invention, the sealing of the open ends includes: melting said easily meltable alloy in a crucible mounted in the housing under the open ends of the microcylinders; bringing the alloy in its melted state in contact with the open ends by an electric drive; providing an excessive pressure in the chamber in order to push the melted alloy into the open ends, thereby forming alloy columns in the microcylinders near the ends; disconnecting the microcylinders from the melted alloy; and solidifying said alloy columns, thereby forming the plugs.

There has thus been outlined, rather broadly, the more important features of the invention so that the detailed description thereof that follows hereinafter may be better understood, and the present contribution to the art may be better appreciated. Additional details and advantages of the invention will be set forth in the detailed description.

BRIEF DESCRIPTION OF THE DRAWINGS

In order to understand the invention and to see how it may be carried out in practice, preferred embodiments will now be described, by way of non-limiting examples only, with reference to the accompanying drawings, in which.

DETAILED DESCRIPTION OF THE PREFERRED EMBODIMENTS

Figure 1:
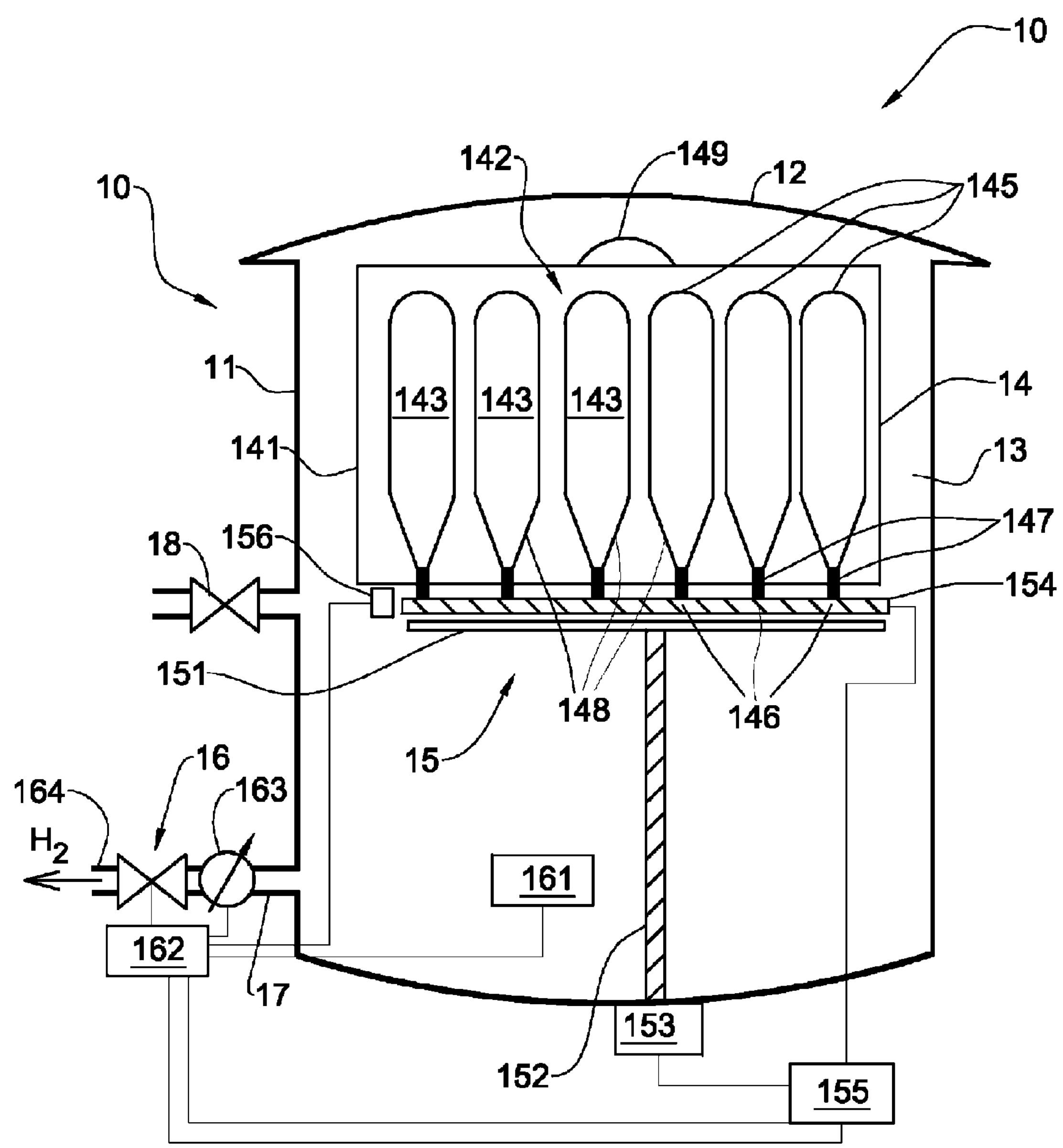
FIG. 1 is a schematic cross-sectional view of an apparatus for storage and liberation of gas, according to one embodiment of the present invention.

The principles and operation of an apparatus for storage hydrogen gas according to the present invention may be better understood with reference to the drawings and the accompanying description. It should be understood that these drawings are given for illustrative purposes only and are not meant to be limiting. It should be noted that the figures illustrating various examples of the apparatus of the present invention are not to scale, and are not in proportion, for purposes of clarity. It should be noted that the blocks as well other elements in these figures are intended as functional entities only, such that the functional relationships between the entities are shown, rather than any physical connections and/or physical relationships. The same reference numerals and alphabetic characters will be utilized for identifying those components which are common in the hydrogen storage apparatus and its components shown in the drawings throughout the present description of the invention.

Referring to FIG. 1, a schematic cross-sectional view of an apparatus 10 for storage and liberation of gas is illustrated, according to one embodiment of the present invention. The gas storage and liberation apparatus 10 comprises a housing 11 having a detachable cover 12 adapted to open and seal the housing 11. The sealed housing 11 defines a chamber 13 that includes a cartridge (module) 14 mounted in the chamber 13 with the help of fasteners (not shown). The cartridge 14 can be inserted into the chamber 13 and removed therefrom through an opening (not shown) that is sealed by the detachable cover 12. Shape of the housing 11 can, for example, be tubular. However, it should be understood that generally, any desired shape of the housing 11 can be used. The housing 11 can be constructed of a suitable metal, plastic or composite material with thickness of the walls appropriate to withstand the strain on the walls caused by the gas pressure inside the housing 11.

The apparatus 10 also includes a gas liberating tool 15, and a control system 16 operatively coupled to the gas liberating tool 15 and configured for controlling operation thereof.

According to one embodiment of the present invention, the cartridge 14 includes a case 141 and an array structure 142 of micro-containers located in the case 141. The array structure 142 of the micro-containers includes a plurality of closely packed hollow microcylinders (capillaries) 143 defining the cavities in which the compressed gas can be trapped. The microcylinders 143 in the array structure 142 can have any desired shape in their cross-section and be closely (intimately) packed in the case 141. Examples of the cross-section shape include, but are not limited to, circular, oval, polygonal, hexagonal, etc. It should be understood that when the cross-section shape is hexagonal the closest packing of the microcylinders 143 can be obtained.

Preferably, but not mandatory, the microcylinders 143 in an array structure 142 are bound together to form a rigid structure. For example, the microcylinders 143 can be tied with a fastener (not shown), e.g., girded with a fastening band. Likewise, when the microcylinders 143 are made of glass, aramid or metal, they can be bound together, for example, by welding, brazing and/or sintering. Moreover, an adhesive material, e.g., epoxy adhesives, can also be used for binding the microcylinders 143 together.

According to one embodiment of the present invention, ends 145 of the microcylinders 143 (distal to the liberating tool 15) are permanently sealed, e.g., capped on the ends by semi-spheres with comparable wall thickness. Other ends 146 of the microcylinders 143 (proximal to the liberating tool 15) can be either open or sealed with plugs 147. In particular, the ends 146 are open when the cartridge is not filled with compressed gas, to enable free penetration of the gas inside the cavities. After the filling of the microcylinders 143 with a compressed hydrogen gas, the ends 146 are sealed with the plugs 147, as will be described in detail hereinbelow with reference to FIG. 2. At the ends 146, the microcylinders 143 preferably have tapering portions 148 in the form of a cone, in order to prevent the pushing of the plugs 147 out from the ends 146 by the highly pressurized gas stored in the cavities of the microcylinders 143.

The microcylinders 143 are made of a material having high tensile strength σ and low mass density ρ. For example, when the gas stored in the apparatus 10 is hydrogen, the materials that meet the condition $\sigma/\rho \geqq 1700$ MPa·cm$^3$/g are suitable for the microcylinders 143. Examples of the materials suitable for the microcylinders 143 include, but are not limited to, MgAlSi glass, S-2 Glass™, R-glass available from Saint-Gobain Vetrotex Textiles, T-Glass available from Nitto Boseki Co., Ltd. (Nittobo)), fused quartz, polymers (e.g., Kevlar™, Twaron™), etc.

Generally, the microcylinders 143 can have any desired length. In turn, the external diameter d of the microcylinders 143 can be in the range of about 1 micrometer to about 100 micrometers. Magnitudes of wall thickness h of the microcylinders 143 are defined by the value of the ratio h/d, that can be obtained from the equation $h/d=p/(2\sigma)$, where p is the pressure of the hydrogen stored in the microcylinders 143 and σ is the tensile strength of the microcylinder material. For example, when the gas stored in the apparatus 10 is hydrogen, the ratio of the wall thickness to the external diameter can be in the range of 0.01 to 0.2, depending on p and σ.

It should be noted that the external diameter d and wall thickness h of the microcylinders located in the inner layers (i.e., in the bulk) of the array structure 142 and the peripheral microcylinders can be different. In particular, the external diameter of the microcylinders 143 can be reduced from a center of the assembly structure towards the edges of the structure. By placing larger microcylinders inside the structure and smaller microcylinders towards the edges, a hydrogen accumulation and storage structure is created in which the wall tensions decrease towards the circumference due to lower diameter of the microcylinders. Accordingly, the wall thickness h of the microcylinders can be increased from the center of the assembly structure towards the edges of the structure.

In accordance with the embodiment described above, the array 142 of the microcylinders 143 is enveloped by the case 141. The inner surface of the case wall can be bound to the peripheral microcylinders of the assembly 142. The case 141 can be of any desired shape and have rigidity sufficient for manipulation of the cartridge for its insertion into and removing from the housing 11. Preferably, but not mandatory, the case 141 replicates the shape of the inner surface of the housing 11. Generally, the case 141 can be constructed of any suitable metal, plastic or composite material. When desired, the case 141 and the microcylinders 143 can be made of the same material. Thickness of the case wall can, for example, be 10-100 times greater than the thickness of the microcylinder walls. When required, the case 141 can be equipped with a carry handle 149 configured to facilitate a user to insert, remove and/or carry the cartridge 14.

Methods for fabrication of hollow microcylinders and microcylindrical array structutres are known per se. In particular, various microcylindrical (capillary) arrays made from glass and/or plastics are widely used in x-ray optics and photonics. Generally, the process of fabrication of microcylindrical arrays is divided into three main stages: (i) drawing capillaries with relatively large diameter, (ii) re-drawing them into a bundle of capillaries with smaller diameter, and (iii) sintering capillaries into the array. The existing technology enables one to produce the vast arrays with the capillary diameter down to 1 micron or even less, and the wall thickness-to-diameter ratio less than 5%. For example, capillary arrays suitable for the purpose of the present invention can be obtained from Paradigm Optics, Inc.; 9600 NE 126th Ave, Suite 2540 Vancouver, Wash. 98682 USA; Joint Stock Company "Technology Equipment Glass Structures (TEGS)", Prospect Stroiteley 1-B, Saratov, Russia, 410044, etc.

The gas liberating tool 15 is configured for controllable liberating hydrogen gas from the cartridge 14 in which the hydrogen or other gas is stored at very high pressures into a volume of the chamber 13 that is not occupied by the cartridge 14 and in which the gas is stored at a moderate pressure. For example, the pressure of the hydrogen stored within the cartridge 14 can be higher than 1000 atm (e.g., in the range of 1000 atm-3000 atm), whereas the pressure of the hydrogen within the unoccupied volume of the chamber 13 can be in the range of 5 atm-20 atm. Such pressure can, for example, be needed for the operation of a fuel cell.

For measuring pressure of the gas within the unoccupied volume of the chamber 13 the control system 16 includes a pressure sensor 161 that is operable for producing a gas pressure sensor signal. The pressure sensor 161 is coupled to a controller 162 of the control system 16 which can be arranged outside of the housing 11. The controller 162 is, inter alia, responsive to the gas pressure sensor signal and capable of generating a control signal to the gas liberating tool 15 for controllable liberation of the compressed gas from the cartridge 14, as will be described hereinbelow.

According to one embodiment of the present invention, the gas liberating tool 15 includes a thermal opener (thermal knife) 151 arranged in the housing 11 and mounted on a shaft 152. The shaft 152 is mechanically connected to an electric drive 153 for providing motion to the thermal opener 151. The thermal opener 151 includes a heating strip 154 coupled to a controllable power source 155 arranged outside of the housing 11 and coupled to the controller 162 of the control system 16.

The gas liberating tool 15 can use a temperature sensor 156 associated with the control system 16, and arranged in the vicinity of the heating strip 154. The temperature sensor 156 is configured for measuring temperature of the heating strip 154, and producing a temperature sensor signal indicative of the temperature. The temperature sensor 156 is coupled to the controller 162 of the control system 16 which is, inter alia, responsive to the temperature sensor signal and capable of providing a control of the controllable power source 155. The control is achieved by providing a required electric power to the heating strip 154 to obtain a temperature required for melting the plugs 147, and thereby opening the corresponding microcylinders 143. Care should be taken in order to avoid overheating and damaging the cartridge elements.

The plugs 147 should preferably be made of an easily meltable alloy having good enough adhesion to glass. Specifically, a melting temperature of this alloy must be lower than the working temperature of the microcylinder material. Examples of the alloys suitable for the plugs that are used with borosilicate glass microcylinders include, but are not limited to, Bi52 Pb32Sn, Bi58Sn and In52Sn.

The electric drive 153 is configured for providing rotational and/or forward motion of the shaft 152. Preferably, but not mandatory, a direction of the shaft 152 coincides with the direction of the microcylinders (or microcylindrical cavities), whereas the direction of the heating strip 154 is perpendicular to the direction of the shaft 152. The electric drive 153 is operatively coupled to the controller 162 of the control system 16. In turn, the controller 162 is, inter alia, responsive to the gas pressure sensor signal generated by the pressure sensor 161, and is capable of generating a drive control signal to the electric drive 153 for control of angular speed of rotation and/or speed of forward motion of the thermal opener 151. Liberation of gas from the sealed microcylinders 143 can, for example, be organized in a gradual manner, i.e., by one-by-one heating the sealed ends 146 of the microcylinders 143 above the alloy's melting point with the heated strip 154, thereby melting the plugs 147 and opening the microcylinders 143.

The electric drive 153 can be controlled in such a manner that the speed of rotational and/or forward motion of the thermal opener 151 is increased when the pressure in the chamber 13 is lower than the required level, and vice versa, the speed is decreased when the pressure in the chamber 13 is higher than the required level. For example, in rotation regime, the electric drive 153 can be configured such that during the total destruction of the ends 146, the shaft 152 maintains one total revolution.

The apparatus 10 further includes an outlet pipe 17 coupled to the housing 11. The control system 16 also includes a flow meter 163 and a discharge valve 164 arranged in the outlet pipe 17 and coupled to the controller 162 for controllable discharge of the gas from the chamber 13. In operation, the flow of the gas within the outlet pipe 17 is measured by the flow meter 163 that is operable for producing a gas flow sensor signal. The flow meter 163 is coupled to the controller 162 which is, inter alia, responsive to the gas flow sensor signal and capable of generating a valve control signal for controlling the operation of the discharge valve 164. When the apparatus is used for hydrogen storage, the hydrogen discharged thereby can be used as a fuel or as a raw material in reactions desired by a user. The apparatus 10 can also include one or several safety valves 18 that can automatically open when gas pressure in the chamber 13 reaches a dangerous level.

According to another general aspect of the present invention, there is provided a method of filling the cartridge 14 with gas. The hydrogen filling into the cavities of the microcylinders 143 may occur by permeation of the gas through the open ends 46 followed by a subsequent sealing of the open ends 46 of the microcylinders 143 with the plugs 47.

Figure 2:
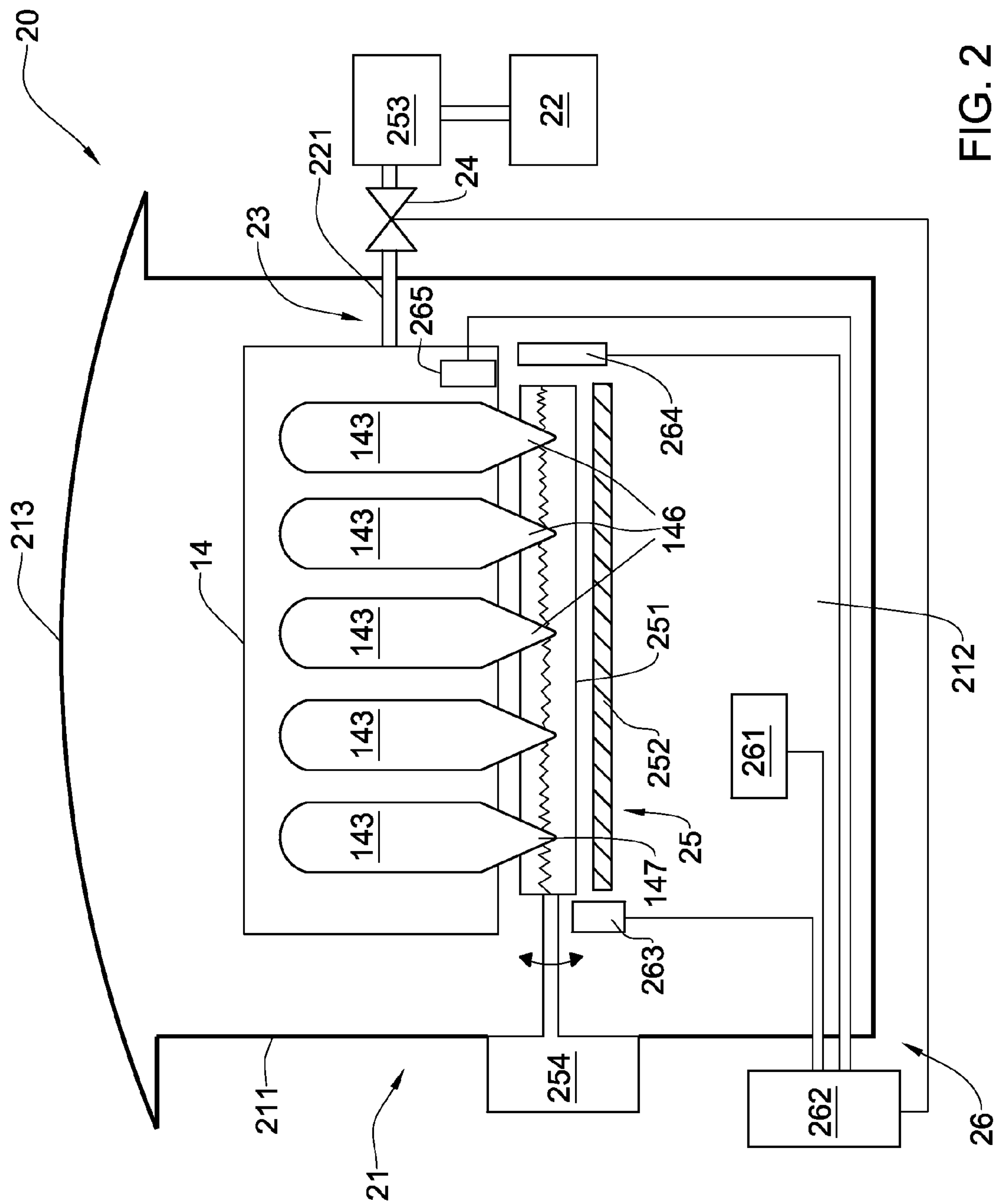
FIG. 2 is a schematic cross-sectional view of a system for filling the cartridge of the present invention with gas.

Referring to FIG. 2, a schematic cross-sectional view of a system 20 for filling the cartridge 14 with gas is illustrated, according to an embodiment of the present invention. As described above with reference to FIG. 1, the cartridge 14 includes an array of the hollow microcylinders 143 having the open ends 146. The system 20 includes an autoclave 21 having a housing 211 coupled to a source 22 of gas used for filling of the cartridge 14 through an inlet manifold 23. The inlet manifold 23 is equipped with a controllable inlet valve 24. The source 22 can, for example, be a vessel (not shown) containing pure hydrogen or other gases used for filling the cartridge 14.

The gas source 22 can include a vessel 221 containing a pure hydrogen gas used for filling of the cartridge 14. The housing 211 is made of material that is capable to withstand very high pressure. In particular, the housing 211 should be capable of withstanding the pressure values exceeding the pressure of the hydrogen gas maintained in the microcylinders 143 of the cartridge (14 in FIG. 1) after the filling. Examples of materials suitable for the housing 211 include, but are not limited to, composite materials containing carbon, quartz and/or aramid filaments.

The housing 211 defines a chamber 212 configured for holding the cartridge 14 that is inserted therein for filling with gas. Preferably, the cartridge 14 is arranged in the housing 211 such that the microcylinders 143 are arranged vertically with the open ends 146 directed down from top to bottom of the housing 211. After insertion of cartridge 14, the housing 211 is sealed, for example, by means of a cover 213 that covers an opening at one of the housing ends through which the cartridge is inserted.

The system further includes a sealing unit 25 configured for sealing the open ends 146 of the microcylinders 143. The system also includes a control unit 26 coupled to the sealing unit 25 and to the controllable inlet valve 24, and configured for controlling operation thereof.

According to an embodiment of the present invention, the sealing unit 25 comprises a crucible 251 mounted in the housing 211 under the open ends 146 of the microcylinders 143. The sealing unit 25 further comprises an electrically heating element 252 associated with the crucible 251. The sealing unit 25 also comprises a controllable compressing unit 253 arranged outside of the autoclave 21 and coupled to the chamber 212 and to the gas source 22 through the inlet manifold 23. The sealing unit 25 also comprises an electric drive 254 mechanically connected to the crucible 251. The electrically heating element 252, and the electric drive 254 can be powered by a power source (not shown) arranged outside of the housing 211.

The crucible 251 is configured for holding an alloy required for melting and forming plugs 147 to seal the microcylinders 143. The electrically heating element 252 is configured for heating and melting the alloy located in the crucible 251. The controllable compressing unit 253 is configured for providing the gas into the chamber 212 through the inlet manifold 23. The controllable compressing unit 253 can be configured for continuous (smooth) or intermittent (step) changes in the pressure of the gas fed into the chamber 212, in accordance with a predetermined algorithm determined by the type of the cartridge 14. The electric drive 254 is configured for moving the crucible 251 up and/or down in order to bring the alloy in its melted state in contact with the open ends 146.

According to one embodiment of the present invention, the control unit 26 includes a pressure sensor 261 arranged in the chamber 212 and operable for producing a gas pressure sensor signal indicative of the gas pressure in the chamber 212. The control unit 26 also includes a controller 262 that can be arranged outside of the housing 211. The controller 262 is operatively coupled to the pressure sensor 261, the controllable compressing unit 253 and the inlet valve 24. The controller 262 is, inter alia, responsive to the gas pressure sensor signal, and capable of generating control signals to the controllable compressing unit 253 and/or the inlet valve 24 for controlling gas supply.

The control unit 26 can further comprise a temperature sensor 263 arranged within the crucible 251. The temperature sensor 263 is operable for producing an alloy temperature sensor signal indicative of the temperature of the alloy. The temperature sensor 263 is coupled to the controller 262, which is, inter alia, responsive to the temperature sensor signal and capable of generating a control signal to the electrically heating element 252 for controlling its heating operation.

The control unit 26 can further comprise an alloy level meter 264 associated with the crucible 251. The alloy level meter 264 is operable for producing an alloy level sensor signal indicative of the level of the alloy in the crucible 251. The level meter 264 can, for example, include a float (not shown) mounted on a float lever arm (not shown) and an indicator (not shown) associated with the float lever arm. The indicator can be operable to indicate a position of the float in the crucible 251.

The indicator of the alloy level meter 264 can be coupled to the controller 262, which is, inter alia, responsive to the alloy level sensor signal, and capable of generating a control signal to the electric drive 264 to control the moving of the crucible 251. Moreover, when required to add an alloy in the crucible 251, the controller 262 can generate an alarm signal to an operator (not shown), indicating that the level of the alloy is less than a predetermined level value.

The control unit 26 can further comprise an alloy column meter 265 arranged in the vicinity of the microcylinders 143. The alloy column meter 265 is operable for producing an alloy column sensor signal indicative of the length of the alloy column in the microcylinders 143 near the ends 146.

The alloy column meter 265 can be a known device suitable for indication of the presence of the alloy on a certain length of the microcylinders 143 near the ends 146. Such a device can, for example, include a light source (not shown) and a photodetector (not shown) measuring the changes of the optic properties of the microcylinders 143 plugged with an alloy to transmit light. According to another example, the presence of the alloy in the microcylinders 143 can be indicated my changes magnetic properties of the microcylinders 143. Accordingly, the alloy column meter 265 can include a corresponding sensor (not shown) configured for measuring the magnetic properties of the microcylinders 143. It should be understood that the present invention is not bound to any particular implementation of the alloy column meter 265 and other sensing devices of the control unit 26.

The alloy column meter 265 can be coupled to the controller 262 which is, inter alia, responsive to the alloy column sensor signal, and capable of generating a control signal to the controllable compressing unit 253, the inlet valve 24 and/or the electric drive 254 for controlling operation thereof. In particular, the length of the alloy column in the microcylinders 143 can be varied by providing an excessive pressure that can push the melted alloy into the open ends 146.

In operation, the cartridge 14 to be filled with hydrogen is placed in the chamber 212 of the autoclave 21 that is then sealed with the cover 213. When the cartridge 14 is placed into the chamber 212, the microcylinders 143 are, preferably, arranged vertically with the open ends 146 directed down.

Then, gas is compressed in the chamber 212, thereby providing permeation of the gas through the open ends 146 into the cavities of the hollow microcylinders 143. The compressing is carried out by the compressing unit 253 that provides gas from the hydrogen source 22 to the chamber 212. During the operation of the compressing unit 253 over the compression time interval, the pressure in the chamber 212 increases. The cavities of the hollow microcylinders 143 receive the gas through the ends 146 and the pressure in the microcylinders 143 also increases. The autoclave is maintained under this regime until the gas pressure in the autoclave reaches a predetermined pressure value. For example, when hydrogen is used, the pressure in the autoclave can reach a value of about 3000 atm. The pressurization rate during the filling procedure can be controlled such that the pressure difference between outer and inner pressure of the microcylinders 143 would not exceed the stress limit for the microcylinders 143 to collapse.

After reaching the predetermined value of the pressure in the chamber 212, the open ends 146 of the microcylinders 143 are sealed with plugs 147 made of an easily meltable alloy having a melting temperature lower than the working temperature of the microcylinder material. The sealing of the open ends 146 includes providing the easily meltable alloy and melting this alloy in the crucible 251 that is mounted in the housing 211 under the open ends 146 of the microcylinders 143. Then, the electric drive 254 can be activated for moving the crucible 251 up in order to bring the melted alloy in contact with the open ends 146. Thereafter, the pressure in the in the chamber 212 can be controllably raised in order to provide an excessive pressure in the chamber for pushing (forcing) the melted alloy to penetrate into the open ends 146 at the desired length. As a result, alloy columns in the microcylinders 143 can be formed near the ends 146. When a desired length of alloy columns (i.e., penetration depth) is reached, the electric drive 254 can be activated for moving the crucible 251 up in order to disconnect the microcylinders 143 from the melted alloy. Then, the temperature of the alloy penetrated inside microcylinders can be decreased below the softening point that will solidify the alloy columns, thereby forming the "solid" plugs 147.

The filled cartridge 14 can be removed from the autoclave 21 and utilized by a consumer, for example, as described above with reference to FIG. 1.

As such, those skilled in the art to which the present invention pertains, can appreciate that while the present invention has been described in terms of preferred embodiments, the conception, upon which this disclosure is based, may readily be utilized as a basis for the designing of other structures systems and processes for carrying out the several purposes of the present invention.

It should be noted that while the present invention has been described for the purpose of storage and liberation of compressed hydrogen gas, the application of the invention is not limited to hydrogen energetics. In the prior art techniques, filling and liberating of hydrogen was based on diffusion of the gas through the walls of the storage microcapsules. Since the diffusion rate of gases other than hydrogen and helium is negligibly low at any reasonable temperatures, such prior art techniques cannot be used for storage and liberation of such gases. This limitation of the prior art techniques is not applicable to present invention, since diffusion through the walls is not used in the apparatus of the present invention.

Accordingly, the present invention can be used for storage and liberation of gases other than hydrogen, e.g. methane, oxygen and so on.

It is to be understood that the phraseology and terminology employed herein are for the purpose of description and should not be regarded as limiting.

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

What is claimed is:

1. An apparatus for storage and liberation of compressed gas, comprising:

- a housing defining a chamber that includes a cartridge comprising an array of hollow microcylinders defining cavities for compressed gas storage, each microcylinder having at least one end sealed with a plug, wherein the plug is made of an easily meltable alloy having a melting temperature lower than the melting temperature of the microcylinder material;
- a gas liberating tool configured for controllable liberating the gas from the cartridge into a volume of the chamber that is not occupied by the cartridge; and a control system operatively coupled to said gas liberating tool, and configured for controlling operation thereof.

2. The apparatus of claim 1, wherein the housing includes a detachable cover adapted to open and seal the housing.

3. The apparatus of claim 1, wherein the microcylinders have tapering portion in the vicintity of said at least one end sealed with the plug.

4. The apparatus of claim 1, wherein said gas liberating tool includes:

a thermal opener arranged in the housing and mounted on a shaft;

an electric drive mechanically connected to the shaft for providing motion to the thermal opener.

5. The apparatus of claim 4, further comprising a controllable discharge valve coupled to the housing through an outlet pipe and to said control system controlling operation thereof.

6. The apparatus of claim 4 wherein the thermal opener includes a heating strip coupled to a controllable power source coupled to the control system.

7. The apparatus of claim 1 wherein said easily meltable alloy is at least one alloy selected from $Sn_{16}Pb_{32}Bi_{52}$, $SnBi_{58}$ and $SnIn_{52}$.

8. The apparatus of claim 5 wherein said control system includes:

a pressure sensor arranged in the chamber and configured for producing a pressure sensor signal representative of the gas pressure in the chamber, a temperature sensor arranged in the vicinity of the thermal opener, said temperature sensor is configured for measuring a temperature of the thermal opener, and producing a temperature sensor signal indicative of the temperature thereof;

a flow meter configured for producing a gas flow sensor signal representative of the flow of the gas in the outlet pipe and a controller operatively coupled to at least one device selected from the thermal opener, said electric drive, said pressure sensor and said flow meter, and being responsive to at least one signal selected from said pressure sensor signal, said temperature sensor signal, and said gas flow sensor signal; said controller being capable of generating control signals for controlling the operation of at least one device selected from said thermal opener, said electric drive, and the discharge valve.

9. The apparatus of claim 1 further including at least one safety valve that can automatically open when pressure in the chamber reaches a dangerous level.

10. The apparatus of claim 1 wherein said gas is selected from hydrogen, methane, oxygen and a mixture thereof.

11. A system for filling a cartridge having an array of hollow microcylinders having open ends and adapted for storing gas, the system comprising:

an autoclave having a housing coupled to a source of a gas used for the filling of the cartridge through an inlet manifold equipped with a controllable inlet valve, said housing defines a chamber holding said cartridge such that said hollow microcylinders are arranged vertically with the open ends directed down;

a sealing unit configured for sealing said open ends; and a control unit coupled to said sealing unit and to said controllable inlet valve, and configured for controlling operation thereof.

12. The system of claim 11, wherein said sealing unit comprises:

a crucible mounted in the housing under the open ends of the microcylinders, and configured for holding an alloy required for forming plugs to seal the microcylinders;

an electrically heating element associated with the crucible, and configured for heating and melting the alloy located in the crucible;

a controllable compressing unit coupled to the chamber and the source of a gas, and configured for providing the gas into the chamber through the inlet manifold; and an electric drive mechanically connected to the crucible, and configured for moving the crucible to bring the alloy in its melted state in contact with said open ends.

13. The system of claim 12, wherein said control unit comprises:

a pressure sensor arranged in the chamber and operable for producing a gas pressure sensor signal indicative of the pressure in the chamber; and a controller operatively coupled to said pressure sensor, said controllable compressing unit, and said inlet valve; said controller being responsive to said gas pressure sensor signal, and capable of generating control signals to at least one device selected from said controllable compressing unit and said inlet valve for controlling operation thereof.

14. The system of claim 13, wherein said control unit further comprises a temperature sensor arranged within the crucible, and operable for producing an alloy temperature sensor signal indicative of the temperature of the alloy; said temperature sensor being coupled to the controller, which is responsive to said temperature sensor signal and capable of generating a control signal to said electrically heating element for controlling operation thereof.

15. The system of claim 13, wherein said control unit further comprises an alloy level meter associated with the crucible, and operable for producing an alloy level sensor signal indicative of the level of the alloy in the crucible; said alloy level meter being coupled to the controller, which is responsive to said alloy level sensor signal, and capable of generating a control signal to said electric drive, and an alarm signal, when the level of the alloy is less than a predetermined level value.

16. The system of claim 13, wherein said control unit further comprises an alloy column meter arranged in the vicinity of the microcylinders and operable for producing an alloy column sensor signal indicative of the length of the alloy column in the microcylinders near the ends; said alloy column meter being coupled to the controller, which is responsive to said alloy column sensor signal, and capable of generating a control signal to at least one device selected from said controllable compressing unit, said inlet valve and said electric drive for controlling operation thereof.

17. A method of filling a cartridge having an array of hollow microcylinders having open ends and adapted for storing gas, the method comprising:

providing said cartridge;

placing said cartridge into a chamber of an autoclave having a housing coupled to a source of gas used for the filling of the cartridge and arranging the cartridge vertically such that the open ends are directed down;

compressing the gas in the chamber, thereby providing permeation of the gas through said open ends into cavities of said hollow microcylinders; and sealing said open ends with plugs made of an easily meltable alloy having a melting temperature lower than the melting temperature of the microcylinder material.

18. The method of claim 17, wherein said sealing of the open ends includes:

melting said easily meltable alloy in a crucible mounted in the housing under the open ends of the microcylinders;

bringing the alloy in its melted state in contact with the open ends by an electric drive;

providing an excessive pressure in the chamber in order to push the melted alloy into the open ends, thereby forming alloy columns in the microcylinders near the ends;

disconnecting the microcylinders from the melted alloy; and solidifying said alloy columns, thereby forming the plugs.

* * * * *